3,342,877
CYCLOPROPYL ALKENOLS USEFUL
IN PERFUMES
Marc Julia, Paris, France, assignor to Rhone Poulenc
S.A., a French body corporate
No Drawing. Filed Dec. 8, 1960, Ser. No. 74,490
Claims priority, application France, Aug. 5, 1958,
771,895; July 8, 1959, 799,655
10 Claims. (Cl. 260—617)

This application is a continuation-in-part of application Ser. No. 831,052, filed Aug. 3, 1959, and now abandoned.

The present invention relates to new organic compounds of the formula:

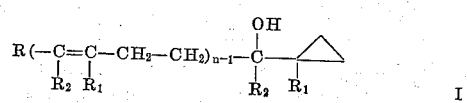
I in which R represents an alkyl group, $R_1$ represents a hydrogen atom or an alkyl or aralkyl group, $R_2$ represents an alkyl group and $n$ is 2 or 3, the groups shown between parentheses being the same or different. The said compounds are useful in the art of perfumery, as referred to later herein, and the preferred compounds from this standpoint are those in which the alkyl groups contain at most 3 carbon atoms and the aralkyl group, if present, is the benzyl group.

According to a feature of the invention these new products may be prepared by the action of a ketone of the Formula II:

II where $R_1$ and $R_2$ have the meanings given above, on an organo magnesium compound of the general Formula III:

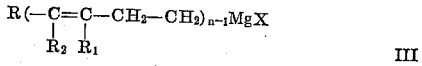
III in which X represents a halogen atom such as chlorine or bromine and the other symbols have the meanings given above. The reaction may be effected in any suitable organic solvent, for example diethyl ether. The resulting complex is then hydrolysed, for example by means of a saturated solution of ammonium chloride.

The ketones of Formula II, utilised as starting material for the preparation of the products of the invention, may be prepared from an α-acyl γ-butyrolactone of the general Formula IV:

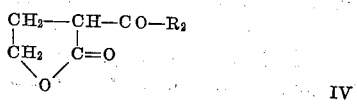
IV or from an α-acyl γ-butyrolactone of the Formula V:

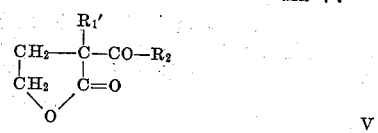
V in which $R_1'$ represents an alkyl or aralkyl group and $R_2$ an alkyl group (itself the product of the reaction of a halide of the formula $R_1'X$ on an alkali metal derivative of a compound of Formula IV).

By boiling with an aqueous solution of a hydrohalic acid (e.g. hydrochloric acid or hydrobromic acid) the acyl butyrolactones of Formulae IV and V are transformed into compounds of the general Formula VI:

VI in which the symbols have the meanings given above.

Treated in turn with a strong base (such as sodium or potassium hydroxide) the compounds VI give the ketones of Formula II.

The compounds of Formula VII:

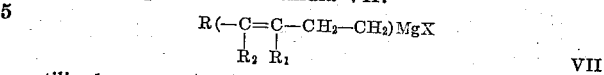
VII utilised as starting material, are obtained by reacting an organic magnesium compound of the formula RMgX with a cyclopropyl ketone of Formula II according to the method described above, thus producing an alcohol of the general Formula VIII:

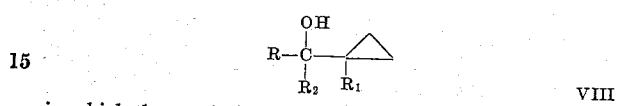
VIII in which the symbols have the meanings given above, then treating this alcohol with a concentrated hydrohalic acid, such as hydrochloric acid or hydrobromic acid, thus forming a halogen derivative of Formula IX:

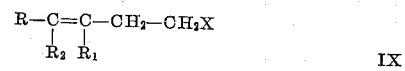
IX and then reacting this halogen derivative with magnesium by known methods.

The derivatives of Formula X:

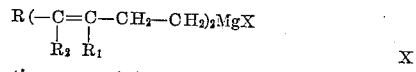
X also used as starting material, can be obtained from the products of Formula I in which $n$ is 2 by applying to them the same method as to the alcohols of Formula VIII.

The invention also provides new intermediate compounds and in particular those of the formulae:

(1)

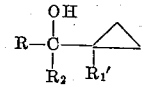

in which $R_1'$ is an alkyl group or aralkyl group and R and $R_2$ are alkyl groups.

(2)

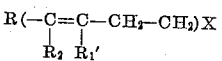

in which the different symbols have the meanings given to them above.

(3)

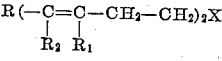

in which the symbols have the meanings given to them above.

The products of Formula I are interesting in that they all have an appreciable odour with, for each of them, an original and distinguishing tone which in a field as subtle as that of perfumery constitutes a valuable asset for the preparation of new complex perfumes.

The intermediate alcohols of Formula VIII also possess odours of particular value.

The following examples will serve to illustrate the invention:

EXAMPLE I 65. g. of 1-bromo-4-methyl-pent-3-ene in solution in 200 cc. of ether are added in 3 hours to 10 g. of magnesium covered with 20 cc. of diethyl ether. The mixture is heated under reflux for 1 hour and a solution of 33.6 g. of methylcyclopropylketone in 300 cc. of diethyl ether is slowly added to the solution, cooled at 5–10° C. After standing for one night, the complex mixture is hydrolysed by a saturated ammonium chloride solution and there is obtained, in a yield of 80%, 6-methyl-2-cyclopropyl-hept-5-en-2-ol, which is a colourless liquid boiling at 115–118° C. under 20 mm. Hg and at 72° C. under 1 mm. Hg; $n_D^{20}=1.4660$.

EXAMPLE II 67 g. of 6-methyl-2-cyclopropyl-hept-5-en-2-ol are vigorously agitated at room temperature with 160 cc. of 48% hydrobromic acid. After extraction with petroleum ether, washing and drying over potassium carbonate, there are obtained 76 g. of 1-bromo-4:8-dimethyl-nona-3:7-diene, which is a colourless liquid boiling at 88–92° C. under 1 mm. Hg.

A solution in 100 cc. of ether of 35 g. of 1-bromo-4:8-dimethyl-nona-3:7-diene is added to 3.6 g. of magnesium covered by 25 cc. of ether. The reaction is started by heating and is maintained throughout the addition of the bromo derivative, which lasts 3 hours. A solution of 12.6 g. of methylcyclopropyl ketone in 50 cc. of ether is thereafter added in 2 hours with cooling. By treating as in Example I, there are obtained 17.5 g. of 6:10-dimethyl-2-cyclopropyl-undeca-5:9-dien-2-ol, which is a colourless liquid boiling at 128–132° C. under 1 mm. Hg and at 96–98° C. under 0.02 mm. Hg; $n_D^{21}=1.4822$.

EXAMPLE III 80 g. of ethyl bromide dissolved in 250 cc. of ether are progressively added to 14.6 g. of magnesium covered by 50 cc. of diethyl ether. To the magnesium derivative solution thus obtained are slowly added with cooling 42 g. of acetyl cyclopropane. After standing for one night, the complex is hydrolysed by the addition of a saturated ammonium chloride solution. It is then extracted, dried and distilled. There are thus obtained 46.2 g. of methylethylcyclopropylcarbinol, B.P.$_{760}$=138–140° C.; $n_D^{19.5}=1.4410$. The infra-red spectrum has the characteristic bands of the cyclopropyl ring.

141.5 g. of methylethylcyclopropylcarbinol are vigorously agitated for 18 minutes with 48% hydrobromic acid (497 cc.), with cooling by means of an ice bath. The mixture is decanted, the aqueous layer is extracted with petroleum ether and the organic layers are combined, washed with an aqueous sodium carbonate solution and then with water, and dried over potassium carbonate. After elimination of the solvent and distillation, there are obtained 176 g. of product, B.P.$_{120}$=114–116° C.; $n_D^{20.5}=1.4780$, analysis of which shows that it is 1-bromo-4-methyl-hex-3-ene.

115 g. of 1-bromo-4-methyl-hex-3-ene in solution in 300 cc. of diethyl ether are progressively poured in 3 hours on to 15.5 g. of magnesium covered by 100 cc. of ether. After refluxing for 1 hour and cooling at 5–10° C., 56 g. of acetyl cyclopropane in solution in 500 cc. of ether are added. The mixture is allowed to stand for one night at room temperature and then hydrolysed by the action of a saturated ammonium chloride solution, extracted and distilled. There are thus obtained 81.5 g. of 6-methyl-2-cyclopropyl-oct-5-en-2-ol, B.P.$_{20}$=113–117° C.; $n_D^{20}=1.4688$.

EXAMPLE IV 91 g. of 6-methyl-2-cyclopropyl-oct-5-en-2-ol are treated with hydrobromic acid by the procedure of Example II and give 106 g. of 1-bromo-4:8-dimethyl-deca-3:7-diene; B.P.$_{.15}$=115–117° C.; $n_D^{19}=1.4885$.

31.6 g. of 1-bromo-4:8-dimethyl-deca-3:7-diene are converted into the magnesium compound, which is thereafter reacted with 8.4 g. of acetylcyclopropane by the procedure of Example II. There are thus obtained 12.5 g. of 6:10-dimethyl-2-cyclopropyl-dodeca-5:9-dien-2-ol, B.P.$_{0.08}$=120–122° C.; $n_D^{19}=1.4835$.

EXAMPLE V

A cold solution of 200 g. of methyl bromide in 600 cc. of anhydrous diethyl ether is poured drop-by-drop on to 50 g. of magnesium covered by diethyl ether, the operation being carried out in an apparatus provided with a condenser containing carbon dioxide snow. The product is then allowed to return to the temperature of the laboratory and 140 g. of 1-methyl-1-acetylcyclopropane are slowly added. After standing for one night, the product is hydrolysed and the treatment is completed as described in Example I. There are thus obtained 123 g. of 2-(1'-methylcyclopropyl)-2-propanol having a camphor odour, B.P.$_{.745}$=131–133° C.; $n_D^{20}=1.4386$, having the 1020, 890 and 3100 cm.$^{-1}$ bands characteristic of the cyclopropane ring.

119 g. of 2 (1'-methylcyclopropyl)-2-propanol treated with 48% hydrobromic acid under the conditions previously described give 165.5 g. of 3:4-dimethyl-1-bromo-pent-3-ene; B.P.$_{.26}$=76° C.; $n_D^{22}=1.4800$.

By proceeding under the operating conditions of Example III but starting with 165 g. of 3:4-dimethyl-1-bromo-pent-3-ene and 23 g. of magnesium, and then reacting the magnesium derivative obtained with 78 g. of acetyl cyclopropane, there are obtained 113 g. of 5:6-dimethyl-2-cyclopropyl-hept-5-en-2-ol, B.P.$_{.4}$=100–102° C.; $n_D^{21}=1.4708$.

EXAMPLE VI

By proceeding as in Example V, but using 1-ethyl-1-acetylcyclopropane (instead of 1-methyl-1-acetylcyclopropane), there are successively obtained:

2-(1'-ethylcyclopropyl)-2-propanol, B.P.$_{.102}$=95–97° C., $n_D^{20}=1.4490$ 3-ethyl-4-methyl-1-bromo-pent-3-ene, B.P.$_{.115}$=124–127° C., $n_D^{20}=1.4835$ 5-ethyl-6-methyl-2-(1'-ethyl-cyclopropyl) - hept - 5-en-2-ol, B.P.$_{.0.2}$=127–128° C., $n_D^{20}=1.4732$.

EXAMPLE VII

By proceeding as in Example V, but starting with 1-benzyl-1-acetylcyclopropane, there are successively obtained:

2-(1'-benzylcyclopropyl) - 2-propanol, B.P.$_{.0.2}$=110–114° C., $n_D^{20}=1.5295$ 3-benzyl-4-methyl-1-bromo-pent-3-ene, B.P.$_{.0.2}$=117–119° C., $n_D^{20}=1.5481$ and, continuing with acetylcyclopropane:

5-benzyl-6-methyl-2-cyclopropyl - hept - 5 - en - 2 - ol, B.P.$_{.0.4}$=182–183° C.

EXAMPLE VIII

By proceeding as in Example II but starting with 5,6-dimethyl-2-cyclopropyl-hept-5-en-2-ol of the Example V, there is obtained:

1-bromo-4,7,8-trimethyl-nona - 3,7 - diene, B.P.$_{.1.2}$=96–98° C.

which is converted into the magnesium derivative and then, by action of acetylcyclopropane, into 6,9,10-trimethyl-2-cyclopropyl-undeca - 5,9 - dien - 2 - ol, B.P.$_{.0.15}$=100° C., $n_D^{22}=1.4852$.

EXAMPLE IX

By proceeding as in Example II but starting with 5-ethyl-6-methyl-2-(1'-ethylcyclopropyl)-hept - 5 - en-2-ol, of the Example VI, there is obtained:

1-bromo-4,8-dimethyl - 3,7 - diethyl - nona - 3,7 - dien, B.P.$_{.0.2}$=133–140° C., $n_D^{20}=1.4969$ which is converted into the magnesium derivative and then, by action of 1-ethyl-1-acetylcyclopropane into:

6,10-dimethyl-5,9-diethyl - (1' - ethylcyclopropyl)undeca-5,9-dien-2-ol, B.P.$_{.0.2}$=180–185° C., $n_D^{20}=1.4886$.

The products of the foregoing examples are of value in perfumery, their characteristics for this purpose being set out below:

*6-methyl-2-cyclopropyl-hept-5-en-2-ol* (*Example No. 1*)

This has an odour of the linalool family, free from the earthy smell which is often found in this product, and having a striking fresh tonality with a highly desirable rustic tinge tending towards the elder stem. This product is more persistent than linalool without being a tail product. Its odour is still distinct after 3 days. This alcohol can be used notably in cassia, bergamot, lemon, eau-de-cologne or toilet water compositions. It is a heart product. When added in a dose of 10% to linalool, it raises the tone, and when added in the same dose to geraniol it brings the tone of geraniol towards that of geranium.

When employed in a dose of 5% in bergamot compositions, it refines the tone thereof. In neroli compositions, it improves the tone of American petit-grain and brings the whole towards natural nerolis. In lily-of-the-valley, it refines the initial tone; in "Chypre" compositions, its presence rounds off the odour of the composition and its fragrance allies especially well to that of oak moss.

*6,10-dimethyl-2-cyclopropyl-undeca-5,9-dien-2-ol (Example No. II)*

This has a hyacinth note and can be used in hyacinth compositions. It is a heart product.

*6-methyl-2-cyclopropyl-oct-5-en-2-ol (Example No. III)*

This has an odour of the linalool family, the fragrance of which is both roseate and more rustic. This product is specially interesting owing to its high persistence, which characteristic does not exist in linalool and like essences. After three days, it still has a powerful odour tending towards that of linalool with a suggestion of jasmine.

*6,10-dimethyl-2-cyclopropyl-dodeca-5,9-dien-2-ol (Example No. IV)*

This product has a waxy odour with a lily-of-the-valley and lilac tone, which diffuses well. Its very discreet tone is evocative of underwood. Although not strong, this odour is very tenacious and strongly perceptible after 3 days. There is found therein, allied with persistence, the normally fugacious tone of lily-of-the-valley and chypre.

*5,6-dimethyl-2-cyclopropyl-hept-5-en-2-ol (Example No. V)*

This has the clean odour of the linalool family, but more flowery, evocative of mimosa; it has a very persistent odour which tends to supplement the excessively fugacious odour of linalool or nerol.

*6-methyl-5-ethyl-2-(1'-ethylcyclopropyl)-hept-5-en-2-ol (Example No. VI)*

This has a peculiar odour evocative of crimson clover and tuberose. It is a heart product.

*6-methyl-5-benzyl-2-cyclopropyl-hept-5-en-2-ol (Example No. VII)*

This product has a clean odour of geranium leaf, more natural than that of geraniol. Interesting by reason of its tone, which is both green and flowery and more persistent than geraniol.

*6,9,10-trimethyl-2-cyclopropyl-undeca-5,9-dien-2-ol (Example No. VIII)*

This has a fresh hay fragrance, evocative of vetiveryl acetate and lemon peel. It is of limited persistence.

*6,10-dimethyl-5,9-diethyl-2-(1-ethylcyclopropyl)-undeca-5,9-dien-2-ol (Example No. IX)*

This has a heavy oily odour having a linalool tone, evocative of lilac and reseda with a suggestion of musk; it is a tail product of mean persistence, interesting for compositions of the origanum, jasmine or tuberose type.

I claim:
1. An organic compound selected from the class consisting of compounds of the formula:

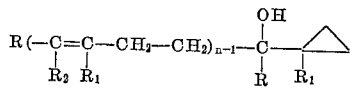

wherein R is methyl or ethyl, $R_1$ is selected from the class consisting of hydrogen, alkyl of at most 3 carbon atoms, and benzyl, $R_2$ represents alkyl of at most 3 carbon atoms, n is an integer at least 2 and not more than 3 and wherein the groups within the parentheses are independently selected.

2. The compound 6 - methyl-2-cyclopropyl-hept-5-en-2-ol.

3. The compound 6,10 - dimethyl-2-cyclpropyl-undeca-5,9-dien-2-ol.

4. The compound 6-methyl-2-cyclopropyl-oct-5-en-2-ol.

5. The compound 6,10-dimethyl-2-cyclopropyl-dodeca-5,9-dien-2-ol.

6. The compound 5,6 - dimethyl-2-cyclopropyl-hept-5-en-2-ol.

7. The compound 6 - methyl-5-ethyl-2-(1'-ethylcyclopropyl)-hept-5-en-2-ol.

8. The compound 6 - methyl-5-benzyl-2-cyclopropyl-hept-5-en-2-ol.

9. The compound 6,9,10 - trimethyl-2-cyclopropyl-undeca-5,9-dien-2-ol.

10. The compound 6,10 - dimethyl - 5,9-diethyl-2-(1-ethylcyclopropyl)-undeca-5,9-dien-2-ol.

References Cited

UNITED STATES PATENTS

| 2,875,249 | 2/1956 | Stanbury et al. | 260—586 |
| 2,908,720 | 10/1959 | Linn | 260—618 |
| 2,921,966 | 1/1960 | Carbon et al. | 260—617 |
| 2,995,607 | 8/1961 | Klemchuk | 260—586 |

FOREIGN PATENTS

| 1,213,486 | 11/1959 | France. |
| 1,106,320 | 5/1961 | Germany. |
| 814,636 | 6/1959 | Great Britain. |

OTHER REFERENCES

Bruylants: Bull. Soc. Chim. Belge, vol. 36, pages 163–65 (1927).

Henry: Bull. Soc. Chim. Belge, vol. 40, pages 647–56 (1931).

Slabey et al.: Jour. Amer. Chem. Soc. 74, 1473–1476 (4 pages) (1952).

Wagner et al.: "Synthetic Organic Chemistry," pages 169, 186, 222 (3 pages), pub. by John Wiley & Sons, Inc. (London, 1953).

LEON ZITVER, *Primary Examiner.*

HAROLD G. MOORE, LORRAINE A. WEINBERGER, *Examiners.*

M. B. ROBERTO, J. E. EVANS, *Assistant Examiners.*